W. C. BROWN.
COOKING UTENSIL.
APPLICATION FILED MAR. 14, 1908.
921,077.
Patented May 11, 1909.
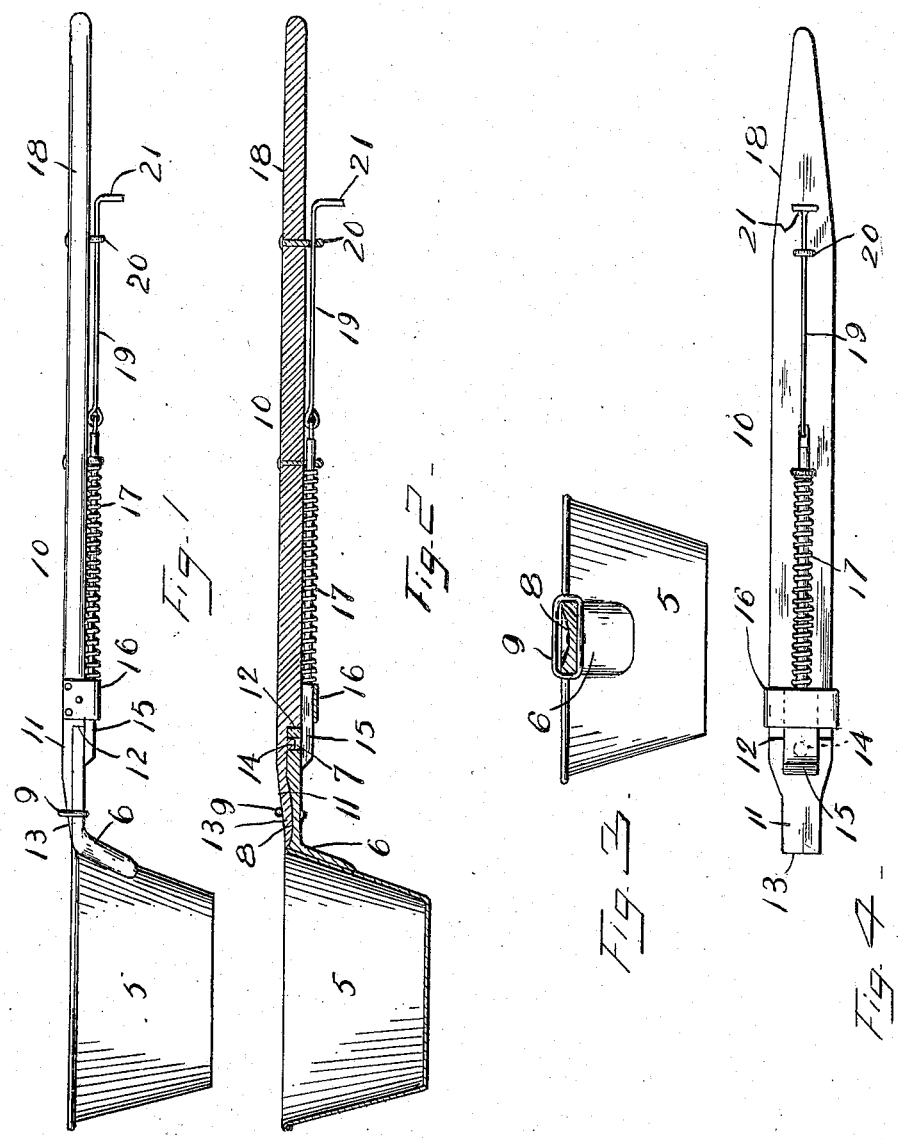

UNITED STATES PATENT OFFICE.

WILLARD C. BROWN, OF FONTANELLE, IOWA.

COOKING UTENSIL.

No. 921,077.　　　Specification of Letters Patent.　　　Patented May 11, 1909.

Application filed March 14, 1908. Serial No. 421,168.

*To all whom it may concern:*

Be it known that I, WILLARD C. BROWN, a citizen of the United States, residing at Fontanelle, in the county of Adair, State of Iowa, have invented certain new and useful Improvements in Cooking Utensils; and I do hereby declare the following to be a full, clear, and exact description of the invention, such as will enable others skilled in the art to which it appertains to make and use the same.

This invention relates to cooking utensils and more particularly to that class having detachable handles.

The primary object of the invention is to provide a cooking utensil having a stub handle and a handle proper which may be securely attached to the stub handle but which may be quickly detached therefrom when so desired, it being understood of course that the handle proper may be laid aside while the vessel is upon the stove and only attached to the vessel when it is desired to remove it from the stove, the handle in this manner being kept cool.

In carrying out my invention, I form the utensil with a stub handle and provide the handle adjacent its outer end with an opening and adjacent its inner end or point of connection with the utensil with a recess across which and encircling the stub handle is a loop and I provide the handle proper at its forward end with a tongue which engages in the recess in the stub handle and beneath the loop. The handle proper is formed with a shoulder adjacent its said end and this shoulder rests against the outer end of the stub handle of the utensil so as to prevent lateral movement of the handle proper with respect to the stub handle, there being a stud formed upon the handle proper in advance of the shoulder for engagement in the opening in the stub handle to aid in attaining this result. A bolt is slidably supported upon the under side of the handle proper and it is between the head of this bolt and the forward end portion of the handle proper that the stub handle is received.

In the accompanying drawings, Figure 1 is a side elevation of a utensil constructed in accordance with my invention and showing the handle attached thereto, Fig. 2 is a vertical longitudinal sectional view through the utensil and handle, Fig. 3 is a transverse sectional view through the stub handle of the utensil taken in a plane with the recess therein, and, Fig. 4 is a bottom plan view of the handle proper.

In the drawings, the numeral 5 indicates the body of the utensil to which is secured a stub handle 6. For a purpose to be presently specifically explained, this handle is formed adjacent its outer end with an opening 7 and adjacent its inner end or point of connection with the utensil with a recess 8, the said recess being formed in the upper face of the said stub handle, and a band 9 is engaged around the stub handle adjacent its inner end and extends across the said recess, the said band being secured upon the stub handle in any suitable manner such as by riveting or welding.

The handle proper for the utensil is indicated in general by the numeral 10 and it is reduced in width at its forward end as at 11 and also reduced in thickness at its said end to form a shoulder 12 upon its under side against which the outer end of the stub handle seats. The handle 10 is formed at its forward end or in other words at the ends of its transversely reduced portion 11 with a tongue 13 which is bent downwardly and forwardly and fits in the recess 8 in the upper face of the stub handle 6 and beneath the band 9 upon the said handle. A stud 14 is formed upon the under side of that portion of the handle proper 10 which is reduced in thickness and when the handle is fitted to the stub handle, this stud seats in the opening 7 formed in the said stub handle, it being understood that by the engagement of the tongue 13 beneath the band and in the recess 8 and the engagement of the stud 14 in the opening 7 in the said stub handle, the handle proper is held against twisting movement with respect to the stub handle.

In order that the handle proper may be held securely to the stub handle, a bolt 15 is slidably mounted in suitable brackets 16 riveted or otherwise secured upon the under side of the handle proper 10 and upon the stem of this bolt is engaged a spring 17 which acts normally to project the head of the bolt forwardly beyond the shoulder 12. A hand grip 18 is formed at the rear end of the handle proper 10 and connected to the corresponding end of the stem of the bolt is a small wire rod 19 which works in a suitable guide 20 and which is formed at its rear end with a finger piece 21.

From the foregoing description of my invention it will be readily observed that the handle proper 10 while ordinarily separate from the utensil may be quickly applied thereto and as easily and as quickly detached therefrom and that for this reason the handle proper may be laid to one side while the vessel is upon the stove and be kept cool thereby obviating the use of cloths with which to grasp the handle as is customary.

What is claimed, is:—

A utensil formed with a stub handle having a perforation and formed with a depression in its upper surface, a band extending across the depression, a detachable handle shaped to fit the depression and extending under the band and having a shoulder abutting against the outer end of the stub handle, a stud on the bottom of the detachable handle entering the perforations of the stub handle, and a bolt carried by the detachable handle and slidable across the joint between said handle and the stub handle.

In testimony whereof, I affix my signature, in presence of two witnesses.

WILLARD C. BROWN.

Witnesses:
  ARTHUR E. BROWN,
  H. J. KUHLMILLER.